(12) United States Patent
Masse et al.

(10) Patent No.: US 6,251,982 B1
(45) Date of Patent: Jun. 26, 2001

(54) COMPOUND RUBBER COMPOSITIONS

(75) Inventors: Michael Alan Masse, Ottignies-Louvain la Neuve (BE); Michael John Modic, Houston, TX (US); Jozef Lucien Cenens, Ottignies-Louvain la Neuve (BE); Ilham Kadri, Ottignies-Louvain la Neuve (BE); Emanuelle Coignoul, Ottignies-Louvain la Neuve (BE)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/153,609

(22) Filed: Sep. 15, 1998

Related U.S. Application Data
(60) Provisional application No. 60/059,637, filed on Sep. 23, 1997.

(51) Int. Cl.[7] .................. C08J 5/10; C08K 5/01; C08L 75/04
(52) U.S. Cl. ................ 524/474; 524/483; 524/515; 524/543
(58) Field of Search ................ 524/474, 483, 524/515, 543; 525/129, 130, 123, 424, 440, 467, 471

(56) References Cited

U.S. PATENT DOCUMENTS

| | | | |
|---|---|---|---|
| 4,347,338 | * | 8/1982 | Torii et al. .................. 525/123 |
| 5,925,724 | * | 7/1999 | Cenens et al. .................. 528/85 |

* cited by examiner

*Primary Examiner*—James J. Seidleck
*Assistant Examiner*—U. K. Rajguru

(57) ABSTRACT

The present invention relates to a compounded rubber composition comprising:

(a) a hydrogenated, polydiene diol based polyurethane having a hard segment content of 10% or greater;
(b) a non-polar extender oil in an amount from 10 to 400 phr; and/or
(c) one or more thermoplastic resin(s) in an amount from 5 to 100 phr.

The invention further relates to molded articles prepared from the compounded rubber composition of the present invention.

18 Claims, No Drawings

COMPOUND RUBBER COMPOSITIONS

This application claims benefit to provisional No. 60/059,637 filed Sep. 23, 1997.

FIELD OF THE INVENTION

The present invention relates to a compounded rubber composition comprising a polyurethane, an oil and/or a thermoplastic resin. The present invention further relates to the use of the compounded rubber for making molded articles such as hoses, dashboards, covers, grips, handles, footwear or parts thereof.

BACKGROUND OF THE INVENTION

Polyurethane rubbers have broad utility in the fashioning of flexible, strong articles. However, conventional polyurethane elastomers are found to be relatively incompatible with extender oils due to the nature of their polyether or polyester soft segment. Polar oils might be used with these commercial polyurethanes but they soften the rigid urethane hard segments to an unacceptable extent. Therefore, polyether-and polyester-based polyurethane rubbers, while flexible and strong, are relatively hard and are not easily compounded with extender oils.

SUMMARY OF THE INVENTION

The present invention relates to a compounded rubber composition comprising:

(a) a hydrogenated, polydiene diol based polyurethane having a hard segment content of 10% or greater;

(b) a non-polar extender oil in an amount from 10 to 400 phr; and/or (c) one or more thermoplastic resin(s) in an amount from 5 to 100 phr.

DETAILED DESCRIPTION OF THE INVENTION

As used herein the abbreviation "phr" stands for parts by weight per 100 parts by weight of rubber, i.e., polydiene diol based polyurethane.

It has now been found that hydrogenated, polydiene diol based polyurethanes are useful when combined with thermoplastic resins and extender oil to produce a polyurethane elastomeric product which is soft but retains its mechanical integrity. The present invention demonstrates excellent thermal, UV and hydrolytic stability as well as excellent low temperature mechanical properties. These compounded rubber compositions are useful for making molded articles and materials such as hoses, dashboards, covers, grips, handles, footwear or parts thereof.

Polydiene Diol-Based Polyurethane

The polyurethane of the present invention has a rubber segment which is strongly aliphatic in nature. The non-polar nature of the extender oils allow extending and plasticization of the rubber segment.

As noted above, the present invention entails a compounded rubber composition which contains a hydrogenated polydiene diol-based polyurethane which has a hard segment content of 10% or greater. Typically, the hard segment content is from 10% to 40%. Preferably, the hard segment content is 12% or greater, more preferably 14% or greater and in the most preferred embodiments, the hard segment content is from 14% to 30%. The hard segment content is reported in % by weight of the total polyurethane. The hard segment content is the amount of isocyanate and chain extender reacted into the polyurethane. Polyurethanes suitable for the present invention generally have a molecular weight from 20,000 to 1,000,000 g/mol, preferably from 40,000 to 200,000 although polyurethanes outside of this range are also contemplated. The polyurethane to be used in the present invention is typically prepared by reacting hydrogenated polydiene diols with isocyanates and then further reacting the resulting prepolymer with suitable chain extenders. The polydiene diol-based-polyurethane may be made by any of the processes known or used in the art, including, but not limited to any prepolymer or one-shot process.

The polydiene diols used to prepare the polydiene diol based polyurethane to be used in the present invention are prepared anionically such as described in U.S. Pat. No. 5,376,745, U.S. Pat. No. 5,391,663, U.S. Pat. No. 5,393,843, U.S. Pat. No. 5,405,911, and U.S. Pat. No. 5,416,168, each incorporated herein by reference. The polydiene diols typically have from 1.6 to 2, preferably from 1.8 to 2, and most preferably from 1.9 to 2 terminal hydroxyl groups per molecule and a number average molecular weight from 500 to 20,000, more preferably from 1000 to 10,000. The conjugated diene monomer(s) used to prepare the polydiene backbone of the hydrogenated polydiene diol is typically selected from conjugated dienes having 4 to 24 carbon atoms, preferably 4 to 8, more preferably butadiene or isoprene, most preferably butadiene. The polybutadiene diols preferably have 1,4-addition between 30% and 70% to minimize viscosity.

Unless indicated otherwise, the number average molecular weights referred to herein are measured by gel permeation chromatography (GPC) calibrated with polybutadiene standards having known number average molecular weights. The solvent used for the GPC analysis is tetrahydrofuran.

Polymerization of the polydiene diols begins with a monolithium or di-lithium initiator which builds a living polymer backbone at each lithium site. The anionic polymerization is carried out in solution in an organic solvent, typically a hydrocarbon such as hexane, cyclohexane or benzene, although polar solvents such as tetrahydrofuran can also be used. The anionic polymerization of butadiene in a hydrocarbon solvent like cyclohexane is typically controlled with structure modifiers such as diethylether or glyme (1,2-diethoxyethane) to obtain the desired amount of 1,4-addition. The optimum balance between low viscosity and high solubility in a hydrogenated polybutadiene polymer occurs between ratios of 1,4-butadiene/1,2-butadiene from 60/40 to 40/60. This butadiene microstructure is achieved during polymerization at 50° C. in cyclohexane containing about 6% by volume of diethylether or about 1000 ppm of glyme.

The anionic polymerization is terminated by the addition of a functionalizing agent such as those disclosed in U.S. Pat. No. 5,391,637, U.S. Pat. No. 5,393,843, and U.S. Pat. No. 5,418,296, each incorporated herein by reference, prior to termination. Preferably, the functionalizing agent is ethylene oxide.

The preferred di-lithium initiator is formed by reacting two moles of sec-butyllithium with one mole of di-isopropenylbenzene. Typically, this di-initiator is used to polymerize a conjugated diene in a solvent composed of 90% w cyclohexane and 10% w diethylether. The molar ratio of di-initiator to monomer determines the molecular weight of the polymer. The living polymer is then capped with two moles of ethylene oxide and terminated with two moles of methanol to yield the desired polydiene diol.

The polydiene diol can also be made using a monolithium initiator which contains a hydroxyl group which has been blocked by a silyl ether group such as disclosed in U.S. Pat. No. 5,376,745 and U.S. Pat. No. 5,414,168, each incorporated herein by reference. A suitable initiator is hydroxypropyllithium in which the hydroxyl group is blocked as the trimethylsilyl ether. This mono-lithium initiator can be used to polymerize a conjugated diene in hydrocarbon or polar solvent. The molar ratio of initiator to monomer determines the molecular weight of the polymer. The living polymer is then capped with one mole of ethylene oxide and terminated with one mole of methanol to yield the mono-hydroxy butadiene polymer. The silyl ether can then be removed by acid catalyzed cleavage in the presence of water yielding the desired polydiene diol. Alternatively, the protecting groups are removed after hydrogenation.

The polydiene diols are typically hydrogenated such that at least 90%, preferably at least 95% of the carbon to carbon double bonds in the diols are saturated. Hydrogenation of these polymers and copolymers may be carried out by a variety of well established processes including hydrogenation in the presence of such catalysts as Raney Nickel, noble metals such as platinum and palladium, or soluble transition metal catalysts and titanium catalysts as in U.S. Pat. No. 5,039,755, incorporated herein by reference. A particularly preferred catalyst is a mixture of nickel 2-ethylhexanoate and triethylaluminum.

The polybutadiene polymer preferably has no less than about 40% 1,2-butadiene addition since after hydrogenation the polymer will be a waxy solid at room temperature if it contained less than about 40% 1,2-butadiene addition. To minimize viscosity of the diol, the 1,2-butadiene content is preferably between 40% and 60%. The diene microstructures are typically determined by $^{13}C$ nuclear magnetic resonance (NMR) in chloroform.

The polydiene diols preferably have hydroxyl equivalent weights between 250 and 10,000, more preferably between 500 and 5,000.

The preferred isocyanate used is a diisocyanate having a functionality of 1.8 to 2.1, more preferably 1.8 to 2, most preferably two isocyanate groups per molecule. Diisocyanates produce thermoplastic polyurethane compositions when combined with a polydiene diol having no more than two hydroxyl groups per molecule. Examples of suitable diisocyanates include, but are not limited to, 4,4'-methylene-bis (phenyl isocyanate), mixtures of isomers of diphenylmethane diisocyanate, toluene diisocyanate, ethylenediisocyanate, paraphenyl-diisocyanate, isophoronediisocyanate, 4,4'-methylene-bis (cyclohexyl-isocyanate), naphthalene diisocyanate and hexamethylene diisocyanate. Difunctional isocyanate prepolymers made by the reaction of an isocyanate with a difunctional extender may also be used. Preferably, the diisocyanate is 4,4'-methylene-bis (phenyl isocyanate) (MDI).

The chain extenders used to make the polydiene diol-based polyurethanes are low molecular weight materials having two functional groups. The number average molecule weight is preferably from 60 to 600 g/mol, more preferably from 80 to 300 g/mol. Suitable functional groups include primary and secondary alcohols, dicarboxylic acids, mercaptans and primary and secondary amines. Preferably, the chain extenders are diols having two hydroxyl groups per molecule. The chain extenders may be linear chain extenders without carbon side chains such as those containing from 3 to 12 carbon atoms including, but not limited to, 1,4-butane diol, 1,3-propane diol, 1,5-pentane diol, 1,6-hexane diol, 1,7-heptane diol, 1,8-octane diol, and 1,9-nonane diol. When linear chain extenders are used, the components should be well mixed or a prepolymer method should be used to improve compatibility. Chain extenders having methyl, ethyl, or higher carbon side chains which make these diols more apolar and therefore more compatible with the apolar hydrogenated polydienes can also be used. Typically such chain extenders have from 4 to 40 carbon atoms. Examples of such chain extenders include, but are not limited to, dimer diol, 1-propyl-2-ethyl-1,3-propanediol, 2-methyl-1,3-propanediol, 2-ethyl-1,3-hexanediol (PEPD), 2,2-dimethyl-1,3-pentanediol, 2-butyl-2-ethyl-1,3-propanediol (BEPD), and 2,2,4-trimethyl-1,3-pentane diol (TMPD). Chain extenders having a high number of carbon atoms relative to hydroxyl groups are also less polar and therefore more compatible with the apolar hydrogenated polydiene diol. An example of such a chain extender is dimer diol. Preferably, linear chain extenders and chain extenders having methyl, ethyl or higher carbon side chains are used. The most preferred chain extenders are 1,4-butane diol, 1,6-hexane diol, 2-butyl-2-ethyl-propane diol and 2-ethyl-1,3-hexanediol.

The chain extender is a critical aspect of the hydrogenated polydiene diol based polyurethane since it together with the isocyanate determines the hard segment of the polyurethane. The percentage of hard segment in the polyurethane in turn determines the strength, hardness and rigidity of the final polyurethane. The amount of hard segment is controlled by incorporating the appropriate amount of diisocyanate and chain extender. Further, linear chain extenders have a tendency to produce crystalline hard segments while branched chain extenders have a tendency to produce amorphous, glassy hard segments.

The amount of polydiene diol added will be determined by the hard segment content desired for the polyurethane. As noted previously, the hard segment will be 10% or greater, typically up to 40%, preferably 12% or greater, more preferably 14% or greater and most preferably from 14% to 30%. Typically, an overall NCO:OH ratio of 0.9 to 1.1, preferably 0.95 to 1.05, exists.

A preferred way to make hydrogenated polydiene diol-based polyurethanes is by the prepolymer method where the isocyanate component is reacted first with the polydiene diol to form an isocyanate terminated prepolymer, which can then be reacted further with the chain extender of choice. A portion of the isocyanate can optionally be added during the reaction with the chain extender. The polyurethane compositions can be formulated to make elastomers using a solventless prepolymer method or a solvent/prepolymer method as described in more detail below.

In the solventless prepolymer method, the polydiene diol is typically heated to at least 70° C., and preferably less than 100° C., and then mixed with the desired amount of isocyanate under dry nitrogen flow to exclude moisture. In a second step the desired amount of chain extender (the amount determined by the % of hard segment required and the stoichiometry) is added and thoroughly mixed before pouring into a heated mold or open pan treated with a mold release agent. The final polyurethane composition is formed by curing the chain extended prepolymer at 80° C. to 120° C. for several hours.

If the prepolymer reaction is slow, the polymerization process can be conducted in the presence of catalysts. Catalysts useful in accelerating the NCO/OH reaction are tertiary amines such as tetramethyl butane diamine and triethylamine, pyridine, 1,4-diaza(2,2,2)bicyclooctane and organometallic compounds such as tin dioctoate and dibutyl tin dilaurate. These catalysts are typically used at levels ranging from 0.001% by weight to 1.0% by weight.

In the solvent/prepolymer method, the polydiene diol is dissolved in a solvent, preferably dry toluene, typically heated to at least 70° C. and preferably not more than 100° C., and then mixed with the desired amount of isocyanate for at least one hour under nitrogen flow. The desired type and amount of chain extender is added and thoroughly mixed until the reaction is complete. After the solvent is removed, the mixture is then postcured for at least 2 hours at 110° C. while under vacuum. The polyurethane composition can then be processed.

Extender Oil

The composition of the present invention also optionally contains a non-polar extender oil in an amount from 10 to 400 phr. Non-polar extender oils are well-known in the art and include both high saturates content oils and high aromatic content oils. Preferred extender oils are highly saturated oils, e.g. mineral oils, both naphthenic and paraffinic oils, or low molecular weight polymers such as polybutadiene, polyisobutylene, atactic polypropylene, atactic polybutylene, polyisoprene or copolymers of butadiene, isoprene and/or styrene. When low molecular weight polymers are used, they will typically have a molecular weight less than 20,000, preferably from 5,000 to less than 20,000. Examples of suitable extender oils include, but are not limited to, SHELLFLEX 371 (a naphthenic oil commercially available from Shell Oil Company), TUFFLO 6056 (a white mineral oil commercially available from Lyondell Lubricants), DRAKEOL 34 (paraffinic oil commercially available from the Penreco Division, Pennzoil Company) and KAYDOL Oil (a white mineral oil commercially available from Witco Chemical Company). SHELLFLEX, TUFFLO, DRAKEOL and KAYDOL are trade marks. The amount of non-polar extender oil used in the present invention is preferably in the range from 25 phr to 300 phr, more preferably from 50 phr to 250 phr, and most preferably from about 75 phr to about 150 phr. Extender oils which may be used in the composition should be capable of being processed with the other components of the composition without degrading. Suitable vegetable oils and animal oils and/or their derivatives may also be used as the non-polar extender oil.

Thermoplastic Resin(s)

The composition of the present invention may also contain a thermoplastic resin. A thermoplastic resin typically adds strength, rigidity and enhances high temperature properties. The thermoplastic resin is typically selected from polyolefins, polyamides, polyesters, polyphenylene ethers, polystyrenes, polyketones and polycarbonates. The amount of thermoplastic resin included in the compositions of the present invention may vary widely depending upon the exact properties desired in the composition. Preferably, the amounts of thermoplastic resin included in the composition may range from 5 phr to 75 phr. More preferably the amounts of thermoplastic resin are from 5 phr to 50, even more preferably from 15 to 40 phr.

When the thermoplastic resin is a polyolefin, it is preferably selected from, for example, polyethylene, polypropylene, polybutylene, ethylene copolymers, propylene copolymers, butylene copolymers, and mixtures thereof. The polyolefin is typically one which, when blended with the polyurethane and optionally oil and subjected to process conditions (i.e., elevated temperature and shear) is processable with the polyurethane and any oil.

The preparation of these various polyolefins is well known. See generally, "Olefin Polymers," Vol. 16, Kirk-Othmer Encyclopedia of Chemical Technology, 3rd Edition, pp 453–469 (1982).

When a polyolefin is used, it is preferably homopolypropylene. The polypropylene is preferably isotactic. A variety of isotactic polypropylenes are available commercially and are suitable in the compositions of the present invention. Syndiotactic homopolymers can also be used. Modified polypropylenes, for example, maleic anhydride functionalized polypropylenes may also be used in the compositions of the present invention. The preparation of polypropylene is well known in the art. See generally, Mark, Bikales, Overberger and Menges, Encyclopedia of Polymer Science and Engineering, 2nd Edition, pp 485–510 (1988).

Examples of propylene polymers useful in this invention are Polypropylene 5B04N (commercially available from Huntsman Chemical Company), Polypropylene 5A15H (commercially available from Union Carbide), and Polypropylene 5520 (commercially available from Huntsman Chemical Company).

The thermoplastic resin may also be a polyester resin. Thermoplastic polyesters useful in this invention include, but are not limited to, poly(alkylene terephthalate) polymers wherein the alkylene group contains at least 2 carbon atoms. The poly(alkylene terephthalate) polymers may suitably be straight or branched chained. Suitable thermoplastic polyesters include poly(ethylene terephthalate), poly(1,2-propylene terephthalate), poly(1,3-propylene terephthalate), poly(1,3-butylene terephthalate), poly(1,4-butylene terephthalate), and poly(pentylene terephthalate). Many of the thermoplastic polyesters useful in the compositions of this invention are available commercially and all such polyesters can be prepared by known techniques such as by the alcoholysis of esters of the terephthalate acid with ethylene glycols, propylene glycols, butane diols, and pentane diols. Such thermoplastic polyesters may also be prepared by heating the glycol or polyol with the free acids or with halide derivatives thereof. Methods for preparing thermoplastic polyesters are described, for example, in U.S. Pat. No. 2,465,319 and U.S. Pat. No. 3,047,539, each incorporated herein by reference. Examples of commercially available polyester resins include, but are not limited to, VALOX 9530 and VALOX 327 (each commercially available from GE Plastics), SELAR PT 5720 (commercially available from DuPont Chemical Company), and CLEARTUF (commercially available from Shell Chemical Company). VALOX, SELAR and CLEARTUF are trademarks.

The thermoplastic resin may also be a polyphenylene ether (PPE) resin. The PPE resins suitable for use in the present invention are commercially available and are produced by techniques well known in the art such as by oxidizing a phenol with an oxygen-containing gas in the presence of a catalyst system comprising a cuprous salt and a tertiary amine. Suitable PPE resins are homo-and copolymers with repeating units of the formula:

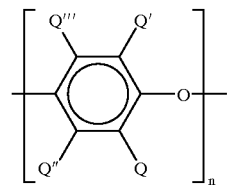

wherein Q, Q', Q" and Q'", are independently selected from the group consisting of hydrogen, hydrocarbon radicals, halohydrocarbon radicals having at least two carbon atoms between the halogen atom and the phenol nucleus, hydrocarbonoxy radicals and halohydrocarbonoxy radicals having at least two carbon atoms between the halogen atom and the phenol nucleus, and Q', Q" and Q'"0 in addition may be halogen with the proviso that Q and Q' are preferably free of any tertiary carbon atoms; and n represents the total number of monomer residues and is an integer of at least 50.

An especially preferred PPE resin for use in the present invention is poly(2,6-dimethyl-1,4-phenylene)-ether. Examples of suitable polyphenylene ethers include, but are not limited to, NORYL BN30 and NORYL 731 (each commercially available from GE Plastics). NORYL is a trademark.

The thermoplastic resin may also be a polyamide. As used herein, the term "polyamide" refers to a condensation product which contains recurring aromatic and/or aliphatic amide groups as integral parts of the main polymer chain. The polyamide matrix is known in the art and embraces those semi-crystalline and amorphous resins having a molecular weight of at least 5,000 having a linear or branched structure. Suitable polyamides include, but are not limited to, those described in U.S. Pat. No. 2,071,250; U.S. Pat. No. 2,071,251; U.S. Pat. No. 2,130,523; U.S. Pat. No. 2,130,948; U.S. Pat. No. 2,241,322; U.S. Pat. No. 2,312,966; U.S. Pat. No. 2,512,606; and U.S. Pat. No. 3,393,210, each incorporated herein by reference. Illustrative examples of alpha-polyamides suitable for use in the present invention include: polypyrrolidone (nylon 4); polycaprolactam (nylon 6); polyheptolactam (nylon 7); polycapryllactam (nylon 8); polynonanolactam (nylon 9); and polyundecanolactam (nylon 11). Illustrative examples of alpha , omega-polyamides include: polyhexamethylene adipamide (nylon 6,6); polyhexamethylene azelaiamide (nylon 6,9); polyhexamethylene sebacamide (nylon 6,10); polyamide of hexamethylenediamine and n-dodecanedioic acid (nylon 6,12); and polyamide of dodecamethylene-diamine and n-dodecanedioic acid (nylon 12,12). Suitable polyamides are available commercially, including, but not limited to ZYTEL 330 (commercially available from DuPont), and ULTRAMID B35 (commercially available from BASF). ZYTEL and ULTRAMID are trademarks.

The thermoplastic resin may also be a polycarbonate, preferably an aromatic polycarbonate resin. Polycarbonates including their methods of manufacture are known in the art. Aromatic polycarbonates are typically derived from dihydric phenols such as, for example, 2,2-bis (4-hydroxyphenyl)-propane, (also referred to as bisphenol-A; i.e., BPA), bis(4-hydroxyphenyl)methane, 2,2-bis(4-hydroxy-3-methylpehenyl)propane, 4,4-bis ((4-hydroxyphenyl)-heptane, 2,2-(3,5,3',5-tetrachloro-4,4'-dihydroxyphenyl) propane, 2,2-(3,5,3',5-tetrabromo-4,4'-dihydroxyphenyl) propane and (3,3,-dichloro-4,4,-dihydroxydi-phenyl)methane. The preferred aromatic polycarbonate is bisphenol-A polycarbonate. Additional information about these aromatic polycarbonates can be obtained from U.S. Pat. No. 4,255,534 and the references cited therein, each incorporated herein by reference. Examples of commercially available polycarbonate resins include, but are not limited to, LEXAN 101 (commercially available from GE Plastics), MAKROLON 3105 (commercially available from Bayer Corporation) and CALIBRE 300 (commercially available from Dow Chemical Company). LEXAN, MAKROLON and CALIBRE are trademarks.

The thermoplastic resin may also be a polystyrene resin. The polystyrene resin used may be prepared from styrene itself, or from any of the analogs or homologs thereof which are suitable for use in styrene polymerization. Suitable examples of polystyrene resins include alpha-methylstyrene, para-methylstyrene, 2,4-dimethylstyrene, chlorostyrene, dichlorostyrene, bromostyrene, dibromostyrene, para-tert-butylstyrene and para-ethylstyrene. Polystyrene resins are commercially available, such as, AMOCO R450 (commercially available from Amoco Chemical Company) and STYRON 613 (commercially available from Dow Chemical Company). AMOCO and STYRON are trademarks.

The thermoplastic resin may also be a polyketone resin. Polyketones useful in this invention are products of the polymerization of carbon monoxide and a vinyl monomer. Examples of the vinyl monomer include but are not limited to ethylene, propylene, butylene and styrene. Processes for the production of the polyketone polymers are illustrated by U.S. Pat. No. 4,808,699 U.S. Pat. No. 4,868,282, each incorporated herein by reference. Both patents teach the production of alternating polymers by contacting ethylene and carbon monoxide in the presence of a catalyst comprising a Group VIII metal compound, an anion of a nonhydrohalogenic acid and a bidentate phosphorous, arsenic or antimony ligand. Suitable polyketone resins are also commercially available and include CARILON DPP1000 and CARILON CRP4012 (each commercially available from Shell Chemical Company). CARILON is a trademark.

Optional Components

Stabilizers known in the art may also be incorporated into the composition. The stabilizers are for protection during the life of the finished product against, for example, oxygen, ozone and ultra-violet radiation. These may also be for stabilization against thermo-oxidative degradation during elevated temperature processing. Antioxidants and UV inhibitors which interfere with the urethane curing reaction must be avoided. Preferred antioxidants are the sterically hindered phenolic compounds like butylated hydroxyltoluene. Stabilizers such as organic-phosphites are also useful. Preferred UV inhibitors are UV absorbers such as benzotriazole compounds. The amount of stabilizer in the formulation will depend greatly on the intended application of the product. If processing and durability requirements are modest, the amount of stabilizer in the formulation will be less than 1 phr. If the polyurethane product will be processed at high temperatures or if the product must survive many years in service, stabilizer concentration could be as much as 10 phr.

Combinations of primary and secondary antioxidants may be used. Such combinations include sterically hindered phenolics with phosphites or thioethers, such as hydroxyphenylpropionates with aryl phosphates or thio ethers, or amino phenols with aryl phosphates. Specific examples of useful antioxidant combinations include, but are not limited to, 3-(3,5-di-t-butyl-4-hydroxyphenyl)-propionate)methane (IRGANOX 1010, commercially available from Ciba-Geigy) with tris(nonyl-phenyl)phosphite (POLYGARD HR, commercially available from Uniroyal), IRGANOX 1010 with bis(2,4-di-t- butyl)pentaerythritol diphosphite (ULTRANOX 626, commercially available from Borg-Warner) and IRGANOX 1010 with dilauryl-3,3'-thiodipropionate (DLTDP, commercially available from Morton International or Ciba-Geigy). Antioxidants that act as bases generally should be avoided. IRGANOX, ULTRANOX and POLYGARD are trademarks.

Combinations of primary antioxidants and UV stabilizers may also be used. Such combinations included sterically hindered phenolics with benzothiazole or piperidinyl compounds. Specific examples useful as stabilizers in the present invention are IRGANOX 1010 with 2-(2-hydroxy-3,5-di-tert-amylphenyl)benzotriazole (TINUVIN 328, commercially available from Ciba Specialty Chemicals) and IRGANOX 1010 with bis(1,2,2,6,6-pentamethyl-4-piperidinyl) sebecate (TINUVIN 765, commercially available from Ciba Specialty Chemicals) and the ternary combination of IRGANOX 1010 with TINUVIN 328 and with TINUVIN 765. TINUVIN is a trademark.

Furthermore, all components or additives are typically compatible with the chemistry involved in the crosslinking reaction. Particular attention must be paid to avoid incorporation of components or additives which inhibit polymer crosslinking.

A wide variety of fillers can be used in formulations with the present invention. Examples of suitable fillers include calcium carbonate, clays, talcs, zinc oxide, titanium dioxide and silica. The amount of filler usually is in the range of from 0 to 800 phr, depending on the type of filler used and on the application for which the formulation is intended. If present, the amount of filler is typically at least 50 phr. Preferred fillers are silica and titanium dioxide. The filler should be thoroughly dried in order that absorbed moisture will not interfere with the reaction between the polyisocyanate and the hydrogenated polydiene diol.

In addition to the components described above, other conventional ingredients such as slipping agents, and flame retarders may be present as well. Such ingredients are typically only present in small quantities, i.e., up to 2% by weight based on the total weight of composition. In this respect it is noted that several inorganic filler materials listed above also have flame retarding properties and hence may be present in larger quantities than 2% by weight.

Preparation Of The Final Compounded Rubber Compositions

The compounded rubber compositions of the present invention can be readily prepared by any of the methods known in the art for preparing rubber compositions such as extrusion and melt blending. Examples of apparatus which may be used to process the compounded rubber compositions of the present invention include, but are not limited to, single or multiple screw extruders, mixing rollers, Brabender internal mixers, Banbury mills, and kneaders.

When melt blending by single or twin screw extrusion is conducted the rubber may be added dry or it may be pre-oiled. Pre-oiling of the polymer may consist of contacting the oil and polymer together and rolling, tumbling or mixing the solid polymer and oil by any suitable means. Alternatively, the rubber and oil may be melt mixed using e.g. single or multiple screw extruders, mixing rollers, Brabender internal mixers, Banbury mills, and kneaders. When pre-oiling is conducted in an extruder the oil is typically metered into the extruder such that the metering rate is matched to the proportion of oil and polymer desired in the final compound.

The thermoplastic resin may be added by dry mixing with the pre-oiled polymer before feeding to the melt mixing operation. Alternatively, the oiled polymer and thermoplastic resin can be metered to the melt mixing operation separately such that the metering rate is matched to the proportion of oiled polymer and thermoplastic resin desired in the final compound. Alternatively, the polyurethane rubber, oil and thermoplastic resin may be metered separately in a melt blending extruder operation. In order to achieve complete absorption and homogenization of the oil it is preferred that the oil is added to the polyurethane rubber melt before any thermoplastic resin is added.

The compositions of the present invention can be prepared by processing the desired portion of the polyurethane with from 10 phr to 400 phr of non-polar extender oil and/or from 5 phr to 100 phr of the thermoplastic resin. The components are typically mixed at a temperature from 150° C. to 280° C. until a homogenous blend is obtained.

The time that the components are mixed will depend upon the manner in which the components are mixed. For example, when the components are mixed using an internal mixer they are typically mixed for 5 to 10 minutes versus when an extruder is used the residence time is typically 1 to 3 minutes. Once the melt blending is completed, test specimens can be prepared by molding processes in order to test for tensile properties, dynamic mechanical characteristics and hardness. The samples utilized for tensile and dynamic mechanical characteristics testing have a thickness of from 0.25 to 0.38 mm. The samples used for testing hardness and compression set are 3.2 mm thick.

As noted above, the compositions of the present invention may be modified by one or more conventional additives such as stabilizers and inhibitors of oxidative, thermal, and ultraviolet light degradation; lubricants and mold release agents, colorants including dyes and pigments, fibrous and particulate fillers and reinforcement and, nucleating agents. These additives may be added at any stage in the preparation of the composition. Preferably the stabilizers are included early to preclude the initiation of degradation before the composition can be protected. Such stabilizers must be compatible with the composition.

The following examples are included to further illustrate the present invention. These examples are for illustrative purposes only and are not intended to limit the invention in any manner.

EXAMPLES

The following components were used in the examples.

A linear, hydrogenated butadiene diol polymer having 1.93 terminal hydroxyl groups per molecule, a number average molecular weight of 3200, and a 1,2-addition of butadiene of 50%, was obtained from Shell Chemical labeled KLP-L2203. This polymer is a viscous liquid at 25° C. but flows readily at slightly elevated temperatures (2500 centipoise viscosity at 60° C.). This polymer was dried by heating it to 90° C. under a nitrogen flow for several hours before reacting it.

KLP-L1203 is a hydrogenated polybutadiene mono-ol having a functionality of 0.92 and a hydroxyl equivalent weight of 4200. It may also be obtained from Shell Chemical.

The poly(oxytetramethylene)glycol used for the comparative example had a molecular weight of 2000 and is commercially available from Dupont as TERATHANE 2000. TERATHANE is a trademark. It was dried by heating it to 90° C. under a nitrogen flow for several hours before reacting it.

The chain extenders used were 1,4-butane diol, BD; 2-butyl-2-ethyl-1,3-propane diol, BEPD and 2,2,4-trimethyl-1,3-pentane diol, TMPD. Prior to use, the chain extenders were dried in a vacuum at 50–60° C. for 2 to 3 hours.

The isocyanate used was 4,4'-diphenylmethane diisocyanate (MDI). It was obtained from Aldrich Chemical in flaked form and was stored in a freezer prior to use. The diisocyanate was handled in a nitrogen filled dry box when dispensing it.

The non-polar extender oil used in Example 3 was DRAKEOL 34. The thermoplastic resin used in Example 3 was Polypropylene 5520. During the melt blending operation stabilizers were added (IRGANOX 1010 at 0.2 phr and DLTDP at 0.5 phr were added as powders).

The dynamic mechanical tests (DMA) were performed using an Imass Rheovibron operated at 11 Hz. The dynamic response to the material was measured from −100° C. to 200° C. The low temperature soft segment Tg was indicated by the maximum in the tan delta as the material warmed from the fully vitrified state. The flow temperature was defined as the temperature at which the elastic modulus began its precipitous drop accompanying softening of the hard segment.

Tensile properties were measured using an Instron tensile tester. An elongation rate of 25.4 cm/min (10 inches/minute) were used.

Hardness was measured using a durometer fitted with a Shore A probe. Values were recorded instantly upon probe-sample contact and after a 10 second relaxation time.

EXAMPLE 1

500 g of KLP-L2203 was dried by heating it to 90° C. under a nitrogen flow for 2 to 4 hours before reacting it. The dried, hot diol was then added to a glass reaction kettle. 71.27 g of MDI was added to the dried, hot diol all at once. The diisocyanate was handled in a nitrogen filled box while being dispensed. The diol and diisocyanate were allowed to react at 90° C. for approximately 90 minutes. During the course of the reaction, the viscous mixture was stirred continuously using a high torque air driven mechanical stirrer. At the end of the prepolymer synthesis, the prepolymer was added to a glass jar heated to 90° C. and 12.85 g of BD was added to the prepolymer mixture and stirred using a high speed Cafcamo mixer. The resulting mixture was stirred for approximately 2–3 minutes before being poured into a release agent-coated aluminum pan. The resulting polyurethane was allowed to cure for approximately 16 hours at 95° C. under vacuum in an oven. The overall molar ratio of NCO/OH was 1.0. A polydiene diol based polyurethane having a hard segment content of 14.4% was obtained.

EXAMPLE 2

The method of Example 1 was used with the following exceptions: 400 g of KLP-L2203 was mixed with 115.6 g of MDI prior to being mixed with 55.88 g of the chain extender BEPD. A polydiene diol based polyurethane having a hard segment content of 30% was obtained.

Comparative Example 1

The method of Example 1 was used with the following exceptions: 400 g of Tetrathane 2000 was mixed with 98.38 g of MDI before being mixed with 17.71 g of MDI. A polyether based polyurethane having a hard segment content of 22.5% was obtained.

EXAMPLE 3

Compounded rubber compositions according to the present invention were prepared by melt blending the polydiene diol based polyurethanes of Example 1 or Example 2 with oil and thermoplastic resin (Compositions 2–7 and 9–12). In addition, the poydiene diol based polyurethanes were tested as such (Compositions 1 and 8). A Comparative Composition in which Tetrathane 2000 was mixed with oil and thermoplastic resin was also prepared (Comparative Composition 1) as well as Tetrathane 2000 alone (Comparative Composition 2). Listed below are the components of each composition prepared.

TABLE 1

| Composition # | Polyurethane | Extender Oil (phr) | Thermoplastic resin (phr) |
|---|---|---|---|
| 1 | Ex. 1 | 0 | 0 |
| 2 | " | 50 | 33 |
| 3 | " | 75 | " |
| 4 | " | 100 | " |
| 5 | " | 150 | " |
| 6 | " | 200 | " |
| 7 | " | 300 | " |
| 8 | Ex. 2 | 0 | 0 |
| 9 | " | 50 | 33 |
| 10 | " | 100 | " |
| 11 | " | 150 | " |
| 12 | " | 200 | " |
| CC1 | CE × 1 | 0 | 0 |
| CC2 | " | 56 | 33 |

Note that CC1 and CC2 denote Comparative Composition 1 and Comparative Composition 2 respectively.

Each of the compositions (those of the present invention and the comparative compositions) was prepared by first melting the polymer in a Brabender internal mixer and maintaining it at a temperature of 170–180° C. while stirring. For those compositions containing non-polar extender oil, the appropriate amount of extender oil was then added and the mixture was allowed to stir for 5 minutes. The appropriate amount of polypropylene was then added and the mixture was allowed to stir for an additional 5 minutes. Once mixed, the mixture was removed from the mixer and allowed to cool. Samples of each composition measuring 0.25–0.38 mm and 3.2 mm thick were prepared for mechanical testing by melt pressing the composition at 200° C. in a Carver press. Samples which did not contain non-polar extender oil or thermoplastic resin were also melt pressed at 200° C. in a Carver press.

The physical test results of the mechanical testing of the thermoplastic polyurethane rubber compounds are included below:

TABLE 2

| | Tensile Properties | | | | DMA Properties | |
|---|---|---|---|---|---|---|
| | Shore A hardness | | Strength | Elongation | Tg rub | T flow# |
| Comp. | Instant | 10 sec. | (MPa) | (%) | (° C.) | (° C.) |
| 1 | 54.2 | 51.2 | 10.3 | 726 | −38 | 135 |
| 2 | 49.7 | 46.5 | 2.6 | 320 | −43 | 120 |
| 3 | 44.9 | 40.3 | 2.5 | 373 | −44 | 111 |
| 4 | 41.2 | 36.4 | 1.8 | 322 | −45 | 112 |
| 5 | 27.3 | 22.5 | 1.5 | 425 | −47 | 100 |
| 6 | 21.1 | 15.1 | 0.9 | 256 | −48 | 85 |
| 7 | 13.1 | — | 0.4 | 143 | −49 | 65 |
| 8 | 68.6 | 65.6 | 23.1 | 542 | −36 | 141 |
| 9 | 66.9 | 62.9 | 8.1 | 606 | −42 | 125 |
| 10 | 41.5 | 33.9 | 3.8 | 522 | −47 | 125 |
| 11 | 42.2 | 33.0 | 1.9 | 448 | −45 | 100 |
| 12 | 29.9 | 20.1 | 1.4 | 469 | −47 | 100 |
| CC1 | 57.5 | 55.2 | 28.7 | 804 | −49/18 | 140 |
| CC2 | – | – | 4.8 | 510 | −49/20 | 145 | onset of flow

All of the compositions 1–12 of the present invention were homogeneous and suffered no oil bleed-out after processing. The samples did not exude oil in the unstretched state or during tensile testing in which the samples experienced elongations of at least 100%. Compositions based on the polyurethane rubber were capable of absorbing up to 300 phr of oil. The compositions were able to be tested at all oil levels demonstrated and claimed in this present invention.

The compounds thus formed were soft and maintained useful mechanical strengths. For example, Composition 4, which contained 100 phr oil, had an instantaneous Shore A hardness of 41.2 and a tensile strength of 1.8 MPa. Also, Composition 10, which also contained 100 phr oil, had an instantaneous Shore A hardness of 41.5 and a tensile strength of 3.8 MPa.

The amount of oil added to the comparative composition CC2 was 56 phr. This amount of oil was greater than the absorption capacity of this polyether based polyurethane as evidenced by oil bleed-out in the unstretched state. Therefore, the useful maximum amount of oil in this polyether based polyurethane is less than 56%. This limits the amount of property modification possible with the polyether-based polyurethane compositions. Even at this relatively low levels of oil incorporation only 17% of the strength of the neat polyurethane rubber is retained. This is compared to Compositions 2 and 9, both of which contain 50 phr of oil. These Compositions retain 25% and 35% of the strength of neat polyurethane rubbers, respectively.

EXAMPLE 4

218 kg of KLP-L2203 was added to a 380 L pilot reactor and was heated under for 120 minutes. The temperature of the diol increased from room temperature to 85° C. within the first 30 minutes of heating. After the 120 minute heating period, 44.5 kg of molten MDI was transferred into the pilot reactor. These two components reacted at 85° C.–88° C. for 90 minutes and a prepolymer was prepared. After the first 60 minutes the residual NCO content was measured by titration to be 3.54% by weight. The theoretical expectation was 3.58%. The prepolymer was heated to 117° C. in the pilot reactor and then transferred to a MAX metered mixing machine. Once in the MAX mixing machine the prepolymer was held at 124° C. The prepolymer was pumped at 151.6 g/s to the mixing head. The chain extender BD was pumped at 5.68 g/s. A TPU (thermoplastic polyurethane) mass of 12 g kg was processed in 13 minutes. This TPU was post-cured in a convection air oven for 16 hours at 110° C. After cooling to room temperature the polyurethane was cut in pieces, and then ground using a Cumberland grinder. The grinder was operated at room temperature.

After being melt-pressed according to the procedure of Example 3, the resulting polyurethane had a tensile strength of 6.6 MPa and an elongation at break of 488%. The instantaneous Shore A hardness was 66.

EXAMPLE 5.

21 kg of KLP-L2203 was added to a 380 L pilot reactor and heated under vacuum to 100.5° C. The KLP-L2203 was stirred under vacuum for 120 minutes while the temperature was gradually reduced to 90° C. 64 kg of molten MDI were transferred to the reactor. The diol temperature was 90° C. at the beginning of MDI addition. The MDI temperature was 56° C. The mixture was held between 95° and 100° C. for 100 minutes. The polymer was then heated to 121° C. and transferred to the MAX mixing machine. The NCO content of the prepolymer was measured by titration to be 5.69% by weight. The theoretical value was 5.66%.

In the MAX mixing machine the prepolymer temperature was 125° C. and the chain extender, TMPD, temperature was 88° C. The prepolymer was metered to the mixing head at 226.8 g/s. The TMPD was metered at 22.2 gls. 46 kg of TPU were made in 5 minutes. The resulting polyurethane was processed as in Example 4.

The resulting polyurethane had a tensile strength of 10.2 MPa and an elongation at break of 551%. The instantaneous Shore A hardness was 70.

EXAMPLE 6

A polyurethane was made using the same prepolymer of Example 5. In this example BEPD was used as the chain extender. The temperature of the prepolymer in the MAX mixing machine was 257° C. and the temperature of the BEPD was 88° C. The prepolymer was metered at 215.9 g/s and the BEPD rate was set to 23.4 g/s. 127 kg of TPU were produced during a 12 minute run time. The resulting polyurethane was processed as in Example 4.

The resulting polyurethane had a tensile strength of 8.8 MPa and an elongation at break of 570%. The instantaneous Shore A hardness was 68.

EXAMPLE 7

Dense plates ($\Phi$=7 cm, about 7 gram) were made by compression moulding the polyurethanes prepared in Experiments 4, 5 and 6 at 180° C. under 15 MPa using a Schwabenthan press. Weighed plates were immersed in a parrafinic oil and the absorbed oil (i.e. PRIMOL 352) is determined by weighing the plates versus time.

The oil absorption rate (% in weight) was established at 23° C.

TABLE 3

| Time (h) | polyurethane Example 4 | polyurethane Example 5 | polyurethane Example 6 | G-1651 | ESTANE 5713P |
|---|---|---|---|---|---|
| 2 | 2.82 | 2.49 | 4.63 | 2.7 | |
| 5 | 4.83 | 4.03 | 8.16 | 4.8 | |
| 24 | | | | 11.0 | |
| 26 | 9.99 | 8.71 | 18.17 | | |
| 48 | | | | 15.7 | 0.02 |
| 126 | 22.33 | 20.98 | 49.01 | | |
| 192 | | | | 31.6 | |
| 365 | 40.36 | 39.49 | 88.51 | | |
| 384 | | | | | 0.10 |
| 504 | | | | 54.5 | |
| 795 | 61.29 | 64.30 | 121.16 | | |
| 840 | | | | 76.6 | |

Further, by way of comparison, the oil absorption of a linear styrene-ethylene/butylene-styrene block copolymer marketed as KRATON G1651 (trade mark) was determined as well as the oil absorption of a conventional aromatic polyester polyol-based polyurethane, marketed under the trade name ESTANE.

Polyurethane (TPU) samples based on BD and TMPD as chain extenders (TPU of Examples 4 and 5) have nearly the same absorption rate as Kraton G1651. The polyurethane of Example 6, chain extended with BEPD, has the highest oil absorption rate.

Comparison with ESTANE shows the good performance of the polyurethanes used in the present invention.

EXAMPLE 8

The polyurethane of Example 4 was used to prepare compounds containing 70% by weight of polyurethane and 30% by weight of thermoplastic resin. Table 4 depicts the thermoplastic resins that were used.

TABLE 4

| Thermoplastic resin | Trade Name | Supplier |
|---|---|---|
| PP (polypropylene) | PP F30S | Montell |
| PPMA (PP grafted with maleic anhydride) | PLEXAR 2110 | Montell |

TABLE 4-continued

| Thermoplastic resin | Trade Name | Supplier |
| --- | --- | --- |
| LDPE (low density polyethylene) | STAMYLEX | Exxon |
| PMMA (poly[methyl methacrylate]) | OROGLAS U825 | Atohass |
| polypropylene soft resin | ADFLEX X100G | Montell |
| PS (polystyrene) | TPS 476L | BASF |
| SEBS (hydrogenated poly[styrene/butadiene]) | KRATON G1651 | Shell |
| SEBS | KRATON G1650 | Shell |
| HDPE (high density PE) | LUPOLEN 6021 | BASF |

The compounds were prepared in a Brabender 350 ml internal mixer, at a temperature between 190° C. and 220° C., depending on the melt temperature of the thermoplastic resin. The screw speed was 50 rpm and the batch weight was 300 g. The tensile strength (TS) and elongation at break (EB) were determined for the compounds thus produced. Results are shown in Table 5.

TABLE 5

| | TPU of Ex. 4 | PP | PP/PPMA | LDPE | PMMA | ADFLEX | PS | G1651 | G1650 | HDPE |
| --- | --- | --- | --- | --- | --- | --- | --- | --- | --- | --- |
| TS (MPa) | 6.6 | 3.1 | 6.5 | 6.5 | 6.3 | 4.9 | 2.6 | 8 | 8.9 | 5.2 |
| EB (%) | 488 | 160 | 255 | 494 | 262 | 392 | 247 | 664 | 550 | 328 |

The best results were obtained with LDPE, PMMA, HDPE, ADFLEX. Good properties were also obtained with KRATON G1651 and KRATON G1650.

EXAMPLE 9

Further compounds were produced according to the procedure of Example 8. The compounds contained polyurethane and various amounts of polypropylene and the tensile strength, elongation at break, Shore A hardness and scratch resistance (using test machine Oesterle 435, commercialised by Erichsen) were determined.

TABLE 6

| | TS (MPa) | EB (%) | Shore A 0 sec | Scratch resistance, (N) |
| --- | --- | --- | --- | --- |
| polyurethane Ex. 4 + | | | | |
| 0% PP | 6.6 | 488 | 64 | 3–4 |
| 30% PP | 3.1 | 160 | 81 | 7 |
| 30% PP + 7% PPMA | 6.5 | 255 | 88 | 7 |
| 30% PP + 7% L1203 | 6.2 | 200 | 86 | 7 |
| 30% PP + 7% L2203 | 6.9 | 180 | 86 | 7 |

Incorporation of PP will lead to decrease in TS and EB. Better mechanical properties are obtained while adding PPMA, KLP-L1203 or KLP-L2203.

EXAMPLE 10

The procedure of Example 8 was repeated to prepare compounds containing polyurethane, paraffinic oil (PRIMOL 352) and one or more thermoplastic resins.

The following compounds A–C (each containing 0.085% wt IRGANOX 1010 and 0.085% wt DLDTP as stabilizers) were prepared.

A:42.66% wt polyurethane of Example 4; 42.66% wt PRIMOL 352 and 14.5 % wt PP polypropylene.

B:49.80% wt polyurethane of Example 4; 34.3% wt PRIMOL 352; 10.96% wt PP and 4.77% wt PPMA.

C:61.3% wt polyurethane of Example 4; 12.33% wt PRIMOL 352 and 26.2%wt KRATON G1651.

Results are shown in Table 7.

TABLE 7

| | A | B | C |
| --- | --- | --- | --- |
| TS (MPa) | 1.8 | 8 | 2.7 |
| EB (%) | 400 | 664 | 496 |

This experiment shows that multiphasic blends may be made using the polyurethanes of the present invention. Of theses blends, blend B shows the best results.

What is claimed is:

1. A compounded rubber composition comprising:

(a) a hydrogenated, polydiene diol-based polyurethane having a hard segment content of 10% or greater;

(b) a non-polar extender oil in an amount from 10 to 400 phr; and (c) one or more thermoplastic resin(s) in an amount from 5 to 100 phr.

2. The composition of claim 1, wherein the hydrogenated polydiene diol-based polyurethane has a hard segment content of 10% to 40%.

3. The composition of claim 1, wherein the hydrogenated polydiene diol-based polyurethane is prepared by reacting a hydrogenated polydiene diol having 1.6 to 2 terminal hydroxy groups per molecule with an isocyanate or isocyanate prepolymer having two isocyanate groups per molecule to form a prepolymer and then reacting the resulting prepolymer with a chain extender selected from the group consisting of linear chain extenders, chain extenders having carbon side chains, and secondary amines.

4. The composition of claim 1, wherein the hydrogenated polydiene diol is a hydrogenated polybutadiene diol.

5. The composition of claim 1, wherein the non-polar extender oil is a mineral oil.

6. The composition of claim 1, wherein the non-polar extender oil is present in an amount from 50 to 300 phr.

7. The composition of claim 1, wherein the one or more thermoplastic resin(s) are selected from the group consisting of polyolefins, polyamides, polyesters, polyphenylene ethers, polystyrenes, polyketones, and polycarbonates.

8. The composition of claim 1, wherein the one or more thermoplastic resin(s) is a polyolefin selected from the group consisting of polyethylene, polypropylene, polybutylene, copolymers of polyethylene, copolymers of polypropylene, copolymers of polybutylene, and mixtures thereof.

9. The composition of claim 8, wherein the polyolefin is present in an amount from 5 to 50 phr.

10. A molded article comprising the composition of claim 2.

11. A molded article comprising a compounded rubber composition comprising:

(a) a hydrogenated, polybutadiene diol-based polyurethane having a hard segment content of 10% or greater;

(b) a non-polar extender oil in an amount from 10 to 400 phr; and (c) a thermoplastic resin in an amount from 5 to 100 phr.

12. The composition of claim 11, wherein the non-polar extender oil is a mineral oil.

13. The composition of claim 11, wherein the non-polar extender oil is present in an amount from 50 to 300 phr.

14. The composition of claim 11, wherein the thermoplastic resin(s) is selected from the goup consisting of polyolefins, polyamides, polyethers, polyphenylene esters, polystyrenes, polyketones, polycarbonates, and combinations thereof.

15. The composition of claim 11, wherein the thermoplastic resin is a polyolefin selected from polyethylene, polypropylene, polybutylene, copolymers of polyethylene, copolymers of polypropylene, copolymers of polybutylene, and mixtures thereof.

16. The composition of claim 15 wherein the polyolefm is present in an amount from 5 to 50 phr.

17. A molded article comprising the composition of claim 11.

18. The composition of claim 11, wherein the hydrogenated polybutadiene diol-based polyurethane has a hard segment content of 10% to 40%.

* * * * *